United States Patent
Hioki et al.

(10) Patent No.: US 11,352,265 B2
(45) Date of Patent: Jun. 7, 2022

(54) POTASSIUM TITANATE POWDER, METHOD FOR PRODUCING SAME, FRICTION MODIFIER, RESIN COMPOSITION, FRICTION MATERIAL, AND FRICTION MEMBER

(71) Applicant: OTSUKA CHEMICAL CO., LTD., Osaka (JP)

(72) Inventors: Toshifumi Hioki, Tokushima (JP); Hiroyoshi Mori, Tokushima (JP); Yasuhito Ito, Tokyo (JP)

(73) Assignee: OTSUKA CHEMICAL CO., LTD., Osaka (JP)

( * ) Notice: Subject to any disclaimer, the term of this patent is extended or adjusted under 35 U.S.C. 154(b) by 326 days.

(21) Appl. No.: 16/347,721

(22) PCT Filed: Dec. 4, 2017

(86) PCT No.: PCT/JP2017/043434
§ 371 (c)(1),
(2) Date: May 6, 2019

(87) PCT Pub. No.: WO2018/110341
PCT Pub. Date: Jun. 21, 2018

(65) Prior Publication Data
US 2019/0315630 A1 Oct. 17, 2019

(30) Foreign Application Priority Data
Dec. 13, 2016 (JP) ................. 2016-241259

(51) Int. Cl.
*C01G 23/00* (2006.01)
*B22F 9/04* (2006.01)
*F16D 69/02* (2006.01)

(52) U.S. Cl.
CPC .............. *C01G 23/005* (2013.01); *B22F 9/04* (2013.01); *F16D 69/025* (2013.01);
(Continued)

(58) Field of Classification Search
None
See application file for complete search history.

(56) References Cited

U.S. PATENT DOCUMENTS

| 6,432,187 B1 | 8/2002 | Ogawa et al. |
| 2003/0147804 A1 | 8/2003 | Ogawa et al. |

(Continued)

FOREIGN PATENT DOCUMENTS

| CN | 1444544 A | 9/2003 |
| CN | 1481968 A | 3/2004 |

(Continued)

OTHER PUBLICATIONS

Third Party Observation dated Apr. 16, 2020, issued in counterpart EP Application No. 17880104.9. (4 pages).
(Continued)

*Primary Examiner* — Colin W. Slifka
(74) *Attorney, Agent, or Firm* — WHDA, LLP

(57) ABSTRACT

Provided is a potassium titanate powder that can avoid safety and health concerns and concurrently, during use in a friction material, can give excellent frictional properties. A potassium titanate powder is a powder formed of bar-like potassium titanate particles having an average length of 30 μm or more, an average breadth of 10 m or more, and an average aspect ratio of 1.5 or more, wherein the bar-like potassium titanate particles are represented by a composition formula $K_2Ti_nO_{2n+1}$ (where n=5.5 to 6.5).

9 Claims, 5 Drawing Sheets

(52) U.S. Cl.
CPC ...... *F16D 69/027* (2013.01); *B22F 2009/041* (2013.01); *B22F 2009/049* (2013.01); *B22F 2203/11* (2013.01); *B22F 2301/054* (2013.01); *B22F 2301/205* (2013.01); *C01P 2004/30* (2013.01); *C01P 2004/61* (2013.01); *C01P 2006/12* (2013.01); *F16D 2200/003* (2013.01)

(56) References Cited

U.S. PATENT DOCUMENTS

| | | |
|---|---|---|
| 2008/0249222 A1 | 10/2008 | Itoi |
| 2010/0112350 A1 | 5/2010 | Tanimizu et al. |
| 2011/0158898 A1 | 6/2011 | Itoi |
| 2016/0272504 A1 | 9/2016 | Hori et al. |
| 2017/0044023 A1* | 2/2017 | Nakashima .......... C01G 23/005 |

FOREIGN PATENT DOCUMENTS

| | | |
|---|---|---|
| CN | 101679067 A | 3/2010 |
| CN | 105050958 A | 11/2015 |
| JP | S61-55216 A | 3/1986 |
| JP | 63-45122 A | 2/1988 |
| JP | H05-73694 B2 | 10/1993 |
| JP | H06-135719 A | 5/1994 |
| JP | H09-278905 A | 10/1997 |
| JP | 11-228300 A | 8/1999 |
| JP | 3027577 B1 | 4/2000 |
| JP | 2000-230168 A | 8/2000 |
| JP | 2001-253712 A | 9/2001 |
| JP | 2008-266131 A | 11/2008 |
| JP | 2015-203473 A | 11/2015 |
| WO | 00/66497 A1 | 11/2000 |
| WO | 2008/123046 A1 | 10/2008 |
| WO | 2014/148374 A1 | 9/2014 |

OTHER PUBLICATIONS

Office Action dated Apr. 23, 2020, issued in counterpart IN Application No. 201917016345, with English Translation. (5 pages).
International Search Report dated Jan. 16, 2018, issued in counterpart International Application No. PCT/JP2017/043434 (1 page).
Notification of Transmittal of Translation of the International Preliminary Report on Patentabililty (Form PCT/IB/338) issued in counterpart International Application No. PCT/JP2017/043434 dated Jun. 27, 2019 with Forms PCT/IB/373 and PCT/ISA/237 (7 pages).
Extended EP Search Report dated Jul. 13, 2020, issued in counterpart EP Application No. 17880104.9 (6 pages).
Oota Toshitaka et al., "Synthesis of potassium hexatitanate fibers by hydrothermal dehydration method", Journal of Crystal Growth, vol. 46, No. 3, Mar. 1, 1979, pp. 331-338; Cited in EESR dated Jul. 13, 2020.
Office Action dated Mar. 11, 2021, issued in counterpart CN Application No. 201780077068.1, with English translation. (15 pages).
The Written Opposition dated Feb. 17, 2022, issued in counterpart JP Patent No. 6906090. (17 pages).
Office Action dated Feb. 23, 2022, issued in counterpart CN Application No. 201780077068.1. (6 pages).
Office Action dated Nov. 23, 2021, issued in counterpart CN Application No. 201780077068.1, with English Translation. (9 pages).

* cited by examiner

[FIG. 1]
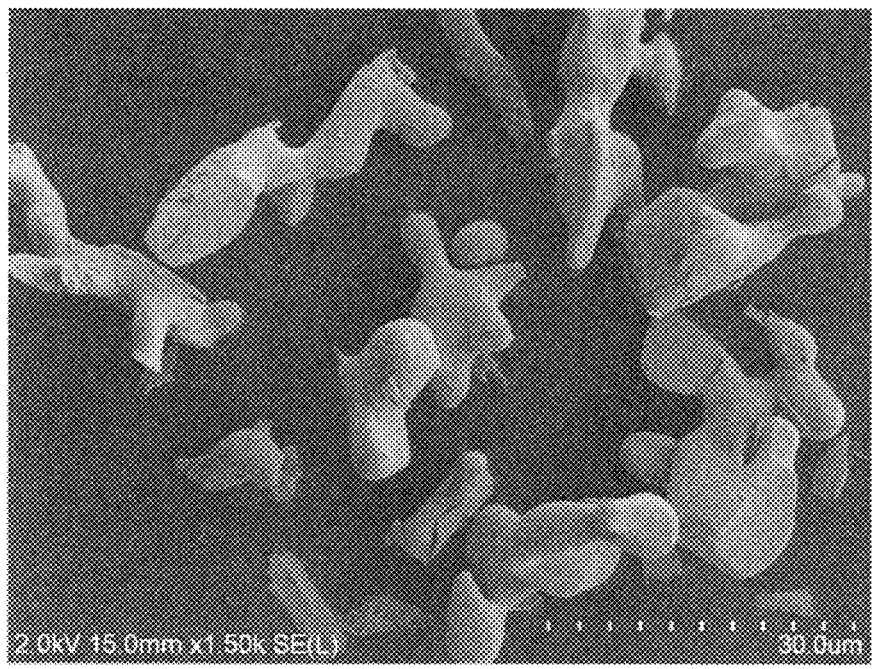
[FIG. 2]
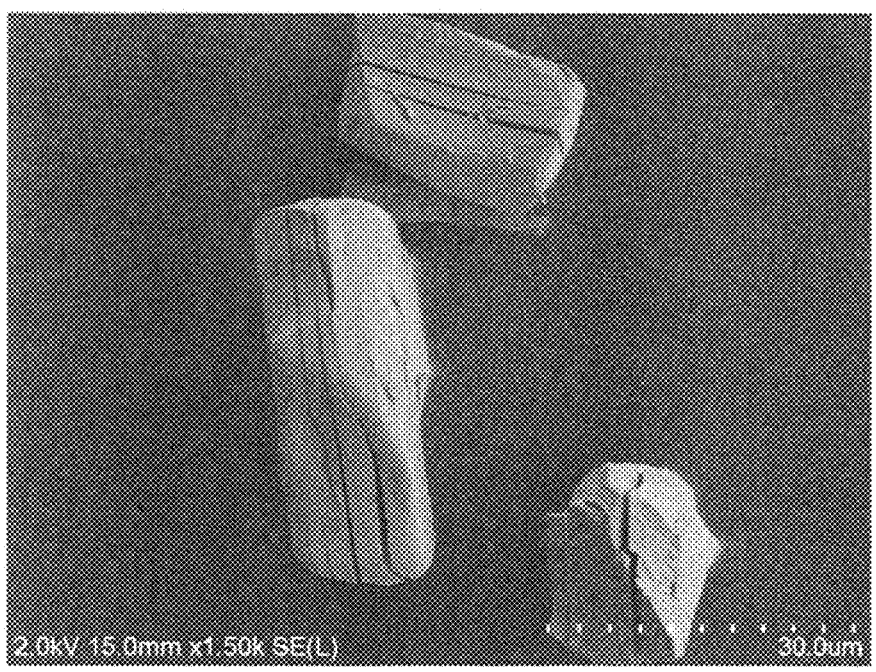

[FIG. 3]
[FIG. 4]
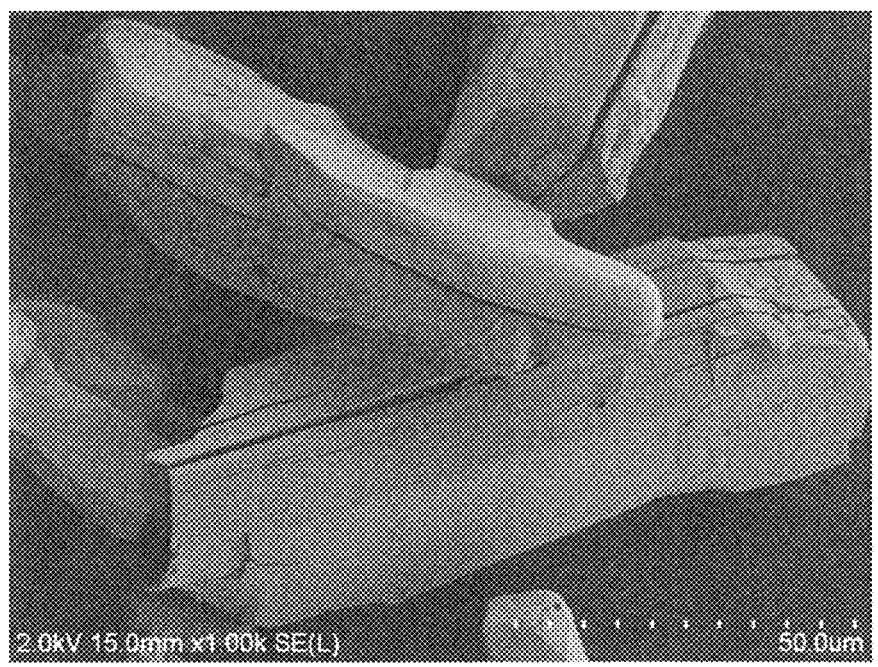

[FIG. 5]
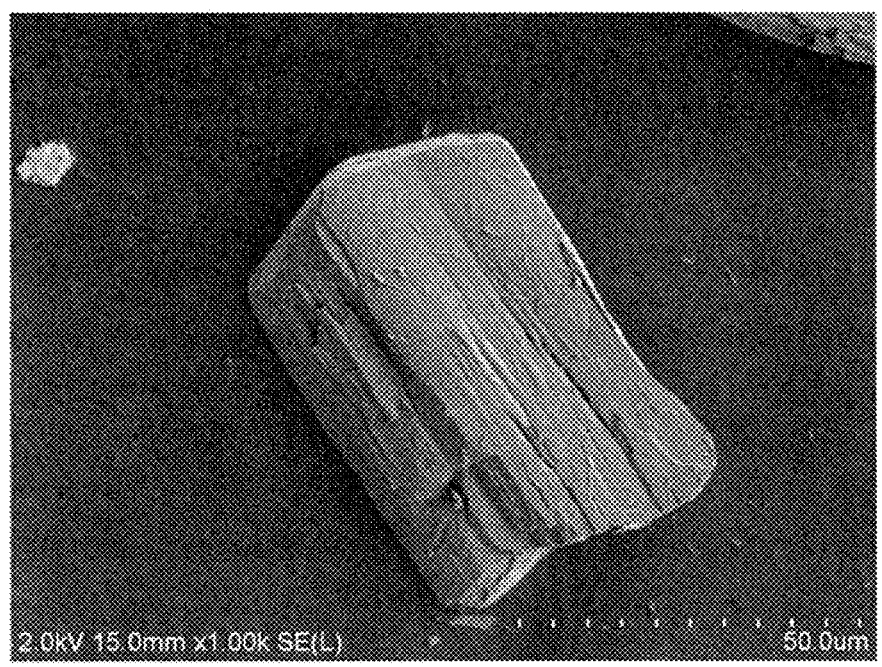
[FIG. 6]
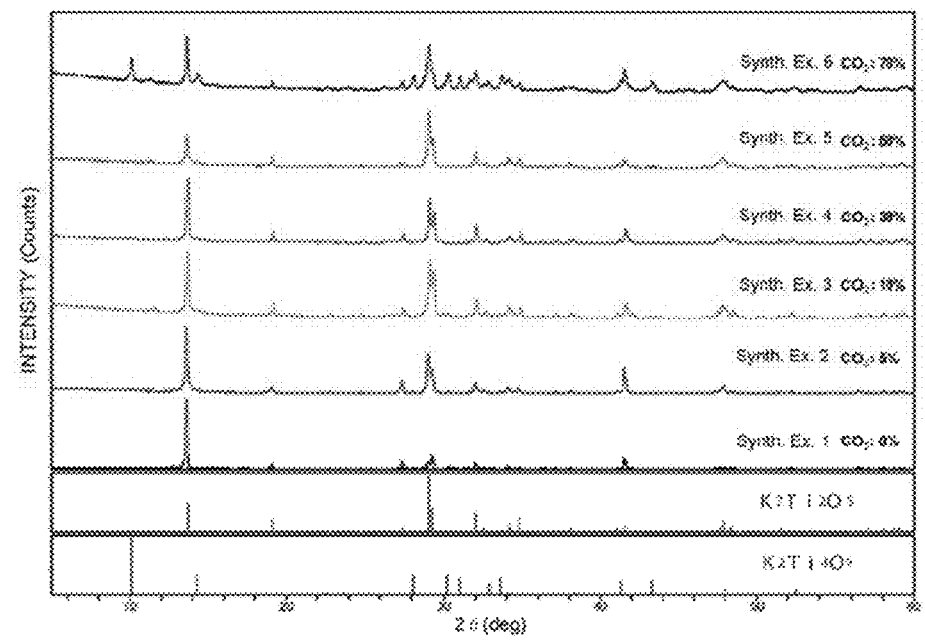

[FIG. 7]
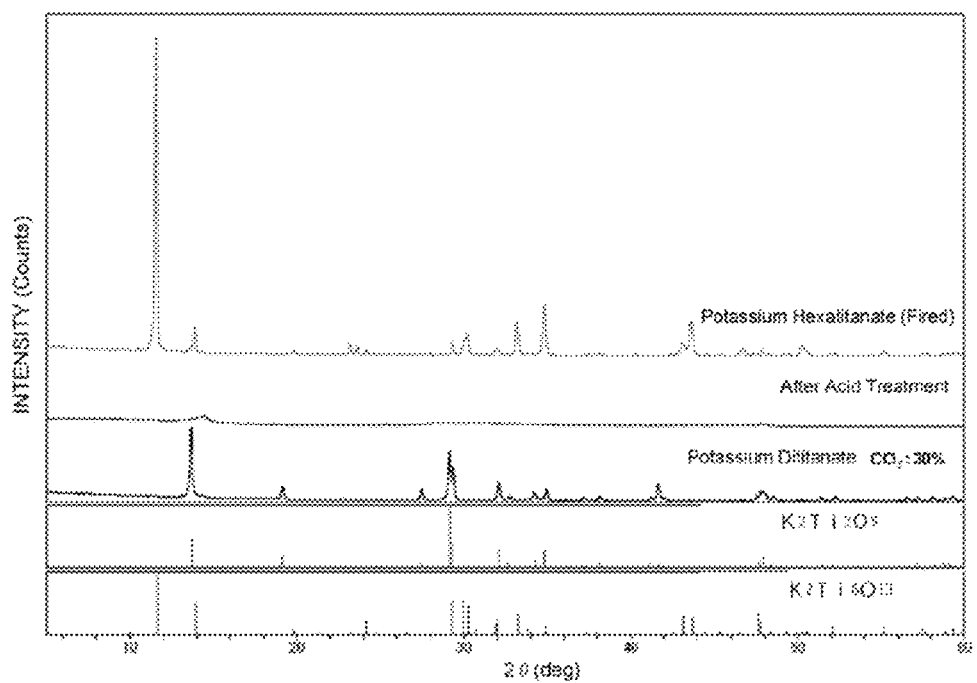
[FIG. 8]
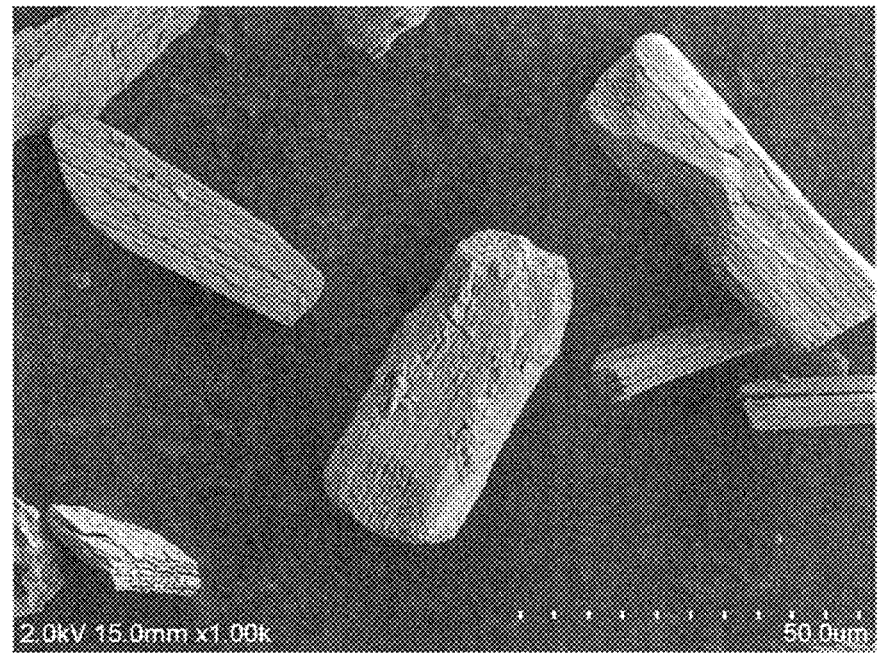

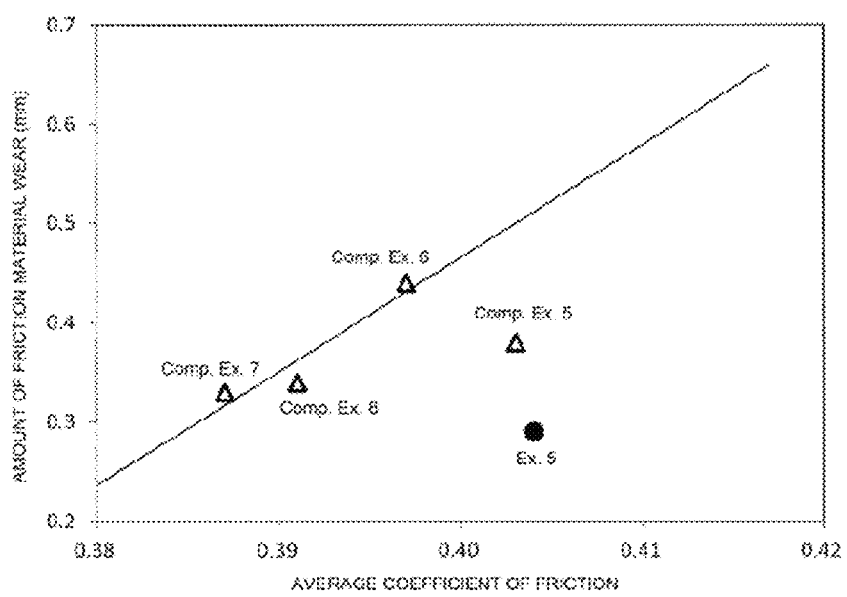

POTASSIUM TITANATE POWDER, METHOD FOR PRODUCING SAME, FRICTION MODIFIER, RESIN COMPOSITION, FRICTION MATERIAL, AND FRICTION MEMBER

TECHNICAL FIELD

The present invention relates to potassium titanate powders, methods for producing potassium titanate powders, friction modifiers, resin compositions, friction materials, and friction members.

BACKGROUND ART

Friction members for various types of vehicles, industrial machines, and so on, such as a brake lining and a disc pad each constituting a part of a braking device, and a clutch facing, are required to have a high and stable coefficient of friction, excellent fade resistance, excellent wear resistance, and low aggressiveness toward a rotor. To meet these properties, a friction member has heretofore been used which includes a friction material made of a resin composition containing asbestos, an inorganic filler, an organic filler, and a thermosetting resin (binder), such as phenolic resin, for binding the above other materials.

However, asbestos has been confirmed to have carcinogenicity and easily turns into dust, for which reason its use is restricted in view of environmental health problems caused by inhalation during work. Therefore, a friction material is proposed and used in which, in substitution for asbestos, fibrous particles of potassium titanate non-carcinogenic, not damaging the rotor unlike metallic fibers, and having excellent frictional properties are used as base material fibers or a friction modifier. Particularly, potassium hexatitanate fibers represented by a general formula $K_2Ti_6O_{13}$ have a tunnel crystal structure and therefore have features of a high melting point, good chemical stability, and less elution of potassium ions. Therefore, a friction material made of a resin composition containing potassium hexatitanate fibers is excellent in thermal resistance, wear resistance, reinforceability, and so on. As a method for producing potassium hexatitanate fibers, there are known, for example, a firing method of mixing a compound forming titanium dioxide by application of heat (hereinafter, referred to as a titanium source) and a compound forming potassium oxide by application of heat (hereinafter, referred to as a potassium source) to give a $TiO_2/K_2O$ molar ratio of about 6 to prepare a starting material and firing the starting material to produce potassium hexatitanate fibers by solid-phase reaction, and a melting method of mixing a titanium source and a potassium source to give a $TiO_2/K_2O$ molar ratio of about 2 to prepare a starting material, melting the starting material by application of heat, solidifying the melt in a single direction to obtain as primary-phase fibers a fiber mass in which potassium dititanate agglomerates in a bundle, washing the fiber mass with water and then an acid to elute potassium ions and deagglomerate the bundle of the fibers, drying hydrated potassium titanate fibers recovered after the washing treatment, and firing them to produce potassium hexatitanate fibers.

However, many types of potassium titanate fibers have an average fiber diameter of 0.1 μm to 0.5 μm and an average fiber length of 10 μm to 20 μm and therefore include WHO fibers (fibrous particles having a length of 5 μm or more, a breadth of 3 μm or less, and an aspect ratio of 3 or more) defined by the World Health Organization (WHO). Hence, there is demand for potassium hexatitanate particles that can achieve properties required as a friction material while avoiding safety and health concerns.

As a response to the demand, Patent Literature 1 proposes that potassium hexatitanate particles having an aspect ratio of 3 or less can be produced by mixing a titanium source and a potassium source to give a $TiO_2/K_2O$ molar ratio of about 2, firing the mixture to obtain potassium dititanate particles, mixing the obtained potassium dititanate particles and a titanium source to give a $TiO_2/K_2O$ molar ratio of about 6, and firing the mixture. Patent Literature 2 proposes that platy potassium hexatitanate can be produced by subjecting platy magnesium potassium titanate or lithium potassium titanate to acid treatment to obtain platy titanic acid, immersing the platy titanic acid into a potassium hydroxide solution, and then firing it. Patent Literature 3 proposes that irregular potassium hexatitanate particles can be produced by mixing a titanium source and a potassium source to give a $TiO_2/K_2O$ molar ratio of about 2 while mechanochemically grinding them, firing the obtained ground mixture to obtain irregular potassium dititanate particles, subjecting the irregular potassium dititanate particles to acid treatment to elute potassium ions, followed by firing. Patent Literature 4 proposes that potassium hexatitanate particles having an average breadth of 3 μm to 10 μm and an average aspect ratio of 1.5 to 10 can be produced by mixing a titanium source formed of agglomerates or granulated matters having an average particle diameter of 0.1 mm to 10 mm and a potassium source to give a $TiO_2/K_2O$ molar ratio of about 6, increasing the temperature to a range of 1000° C. to 1300° C. at a rate of 0.5° C./min to 2° C./min, and then firing the mixture. Patent Literature 5 proposes that particles with an average particle diameter of 20 μm to 100 μm, each formed of an agglomerate of potassium hexatitanate particles having an average thickness (average minor diameter) of 2 μm to 6 μm and an average length (average major diameter) of 3 μm to 10 μm, can be produced by mixing a titanium source and a potassium source to give a $TiO_2/K_2O$ molar ratio of about 6, heating and firing the mixture by increasing the temperature, during temperature increase to the maximum firing temperature over 1000° C., so that the rate of temperature increase from 1000° C. to the maximum firing temperature is 15° C./min or below, then cooling the fired product by decreasing the temperature so that the rate of temperature decrease from the maximum firing temperature to 500° C. is 100° C./min or above, and grinding the obtained cooled product.

Meanwhile, a resin composition for use in a friction member contains, in addition to potassium titanate, copper fibers or copper powder for the purpose of increasing the wear resistance. Thus, it is considered that, during friction between a friction material and a rotor (the other member), the ductility of copper causes formation of an adhesive film on the surface of the rotor and this adhesive film acts as a protective film to enable the resin composition to keep a high coefficient of friction at high temperatures. However, the friction member containing copper involves abrasion powder being produced during braking and it is suggested that the abrasion powder can be a cause of pollution of rivers, lakes, and the sea. Therefore, the copper usage is restricted in North America. Hence, there is demand for potassium titanate particles that can achieve properties required as a friction material even while having a composition free of copper component or containing a small amount of copper.

CITATION LIST

Patent Literature

Patent Literature 1: JP-A-H11-228300
Patent Literature 2: JP-A-2001-253712

Patent Literature 3: WO 2008/123046
Patent Literature 4: JP-A-2008-266131
Patent Literature 5: WO 2014/148374

SUMMARY OF INVENTION

Technical Problem

However, in the methods disclosed in Patent Literatures 1 to 4, particles cannot be grown to a large size, which does not provide sufficient reinforceability and makes the frictional properties insufficient. Furthermore, in the methods disclosed in Patent Literatures 1 and 4 having an object of producing bar-like or fibrous particles, the particles may include WHO fibers exceeding the environmental standard. In the method disclosed in Patent Literature 5, the particles have a large shape, but does not meet the aspect ratio and cannot therefore be expected to provide sufficient reinforceability. In addition, the particle diameter is adjusted by grinding agglomerates of microscopic bar-like particles, which may produce fibrous particles.

An object of the present invention is to provide a potassium titanate powder that can avoid safety and health concerns and concurrently, during use in a friction material, can give excellent frictional properties, a method for producing the potassium titanate powder, and a friction modifier, a resin composition, a friction material, and a friction member in each of which the potassium titanate powder is used.

Solution to Problem

The present invention provides the following potassium titanate powder, the following friction modifier, the following resin composition, the following friction material, the following friction member, and the following method for producing the potassium titanate powder.

Aspect 1: A potassium titanate powder formed of bar-like potassium titanate particles having an average length of 30 µm or more, an average breadth of 10 µm or more, and an average aspect ratio of 1.5 or more, the bar-like potassium titanate particles being represented by a composition formula $K_2Ti_nO_{2n+1}$ (where n=5.5 to 6.5).

Aspect 2: The potassium titanate powder according to aspect 1, wherein a content of particles having a length of 30 µm or more and a breadth of 10 µm or more is 50% by volume or more.

Aspect 3: The potassium titanate powder according to aspect 1 or 2, wherein a content of fibrous particles is 0.3% by volume or less.

Aspect 4: The potassium titanate powder according to any one of aspects 1 to 3, having a specific surface area of 0.3 $m^2/g$ to 3 $m^2/g$.

Aspect 5: A friction modifier made of the potassium titanate powder according to any one of aspects 1 to 4.

Aspect 6: A resin composition containing the potassium titanate powder according to any one of aspects 1 to 4 and a thermosetting resin.

Aspect 7: The resin composition according to aspect 6, wherein a content of a copper component is 0.5% by mass or less in terms of copper element in a total amount of the resin composition of 100% by mass.

Aspect 8: The resin composition according to aspect 6 or 7 for use as a friction material.

Aspect 9: A friction material being a formed body of the resin composition according to any one of aspects 6 to 8.

Aspect 10: A friction member including the friction material according to aspect 9.

Aspect 11: A method for producing a potassium titanate powder, the method including the steps of: (A) mixing, with mechanical grinding, a compound forming titanium dioxide by application of heat or titanium dioxide and potassium carbonate to prepare a ground mixture; (B) heating and firing the ground mixture in an atmosphere with a carbon dioxide concentration of 1% by volume to 60% by volume to prepare potassium dititanate; and (C) eluting potassium from the prepared potassium dititanate, followed by heating and firing.

Aspect 12: The method for producing a potassium titanate powder according to aspect 11, wherein a firing temperature in the step (B) is within a range of 800° C. to 1000° C.

Aspect 13: The method for producing a potassium titanate powder according to aspect 11 or 12, wherein the elution of potassium in the step (C) is performed by mixing an acid into an aqueous slurry of the potassium dititanate to adjust a pH of the aqueous slurry to 11.5 to 12.5.

Aspect 14: The method for producing a potassium titanate powder according to any one of aspects 11 to 13, wherein a firing temperature in the step (C) is within a range of 600° C. to 1300° C.

Advantageous Effects of Invention

The potassium titanate powder according to the present invention can avoid safety and health concerns and concurrently, during use in a friction material, can give excellent wear resistance. In addition, the coefficient of friction of the potassium titanate powder is high and stable, which can give the friction material excellent fade resistance.

BRIEF DESCRIPTION OF DRAWINGS

FIG. 1 is a SEM photograph of particles forming a powder obtained in Synthesis Example 1.

FIG. 2 is a SEM photograph of particles forming a powder obtained in Synthesis Example 2.

FIG. 3 is a SEM photograph of particles forming a powder obtained in Synthesis Example 3.

FIG. 4 is a SEM photograph of particles forming a powder obtained in Synthesis Example 4.

FIG. 5 is a SEM photograph of particles forming a powder obtained in Synthesis Example 5.

FIG. 6 is a graph showing X-ray diffraction charts of powders obtained in Synthesis Examples 1 to 6.

FIG. 7 is a graph showing X-ray diffraction charts of a base material (potassium dititanate), acid-treated potassium dititanate, and an obtained potassium titanate powder (potassium hexatitanate) in Example 2.

FIG. 8 is a SEM photograph of particles forming a powder obtained in Example 4.

FIG. 9 is a graph showing the relationship between the average coefficient of friction and the amount of friction material wear in each of friction materials obtained in Example 5 and Comparative Examples 5 to 8.

DESCRIPTION OF EMBODIMENTS

Hereinafter, a description will be given of an example of a preferred embodiment for working of the present invention. However, the following embodiment is simply illustrative. The present invention is not at all limited by the following embodiment.

<Potassium Titanate Powder>

A potassium titanate powder according to the present invention is a powder formed of bar-like potassium titanate particles having an average length of 30 μm or more, an average breadth of 10 μm or more, and an average aspect ratio of 1.5 or more. Note that the term "bar-like" in the present invention means that, so long as the above average length, average breadth, and average aspect ratio are satisfied, a particle has the overall shape approximately of a bar, inclusive of rodlike, bar-like, columnar, prismoidal, reed-shaped, approximately columnar, approximately prismoidal, and approximately reed-shaped.

The average length and average breadth of the particles in the present invention are diameters at 50% cumulative area calculated from respective area distributions obtained by measuring the long side and short side of, among rectangles circumscribing each particle, a rectangle having the minimum area as its length and breadth, respectively, by image analysis with scanning electron microscopic (SEM) observation. Furthermore, the average aspect ratio is a value obtained by measuring the average length and average breadth in the above manner and calculating the ratio between them (average length/average breadth).

The average length of the bar-like potassium titanate particles according to the present invention is 30 μm or more, preferably 30 μm to 200 μm, and more preferably 35 μm to 100 μm. The average breadth thereof is 10 μm or more, preferably 10 μm to 130 μm, and more preferably 15 μm to 65 μm. The average aspect ratio thereof is 1.5 or more, preferably 1.5 to 5, more preferably 1.5 to 3, and still more preferably 1.5 to 2.5. When the average length, the average breadth, and the average aspect ratio are within the above ranges, the potassium titanate powder can give, during use in a friction material, excellent wear resistance, a high and stable coefficient of friction, and excellent fade resistance.

In the potassium titanate powder according to the present invention, the content of particles having a length of 30 μm or more and a breadth of 10 μm or more is preferably 50% by volume or more, more preferably 80% by volume or more, and still more preferably 90% by volume or more. The above content is a volume-equivalent value obtained by using the length and breadth of each particle measured in the above-described manner to calculate the particle volume by multiplication of length by breadth by breadth.

Furthermore, in the potassium titanate powder according to the present invention, its average particle diameter, which is a particle diameter at 50% cumulative volume in a particle size distribution determined by the laser diffraction and scattering method, is preferably 30 μm to 200 μm and more preferably 35 μm to 100 μm. When the average particle diameter is within the above range, the potassium titanate powder can further increase, during use in a friction material, the frictional properties of the friction material.

In the potassium titanate powder according to the present invention, the content of fibrous particles is preferably 0.3% by volume or less, more preferably 0.2% by volume or less, and still more preferably 0.1% by volume or less. When the content of fibrous particles is within the above range, safety and health concerns can be avoided.

The term fibrous particles in the present invention means particles in which the lengths, breadths, and aspect ratios measured in the above-described manners are 5 μm or more, 3 μm or less, and 3 or more, respectively. The content of fibrous particles is a volume-equivalent value obtained by using the length and breadth of each fibrous particle measured in the above-described manner to calculate the particle volume by multiplication of length by breadth by breadth.

The specific surface area of the potassium titanate powder according to the present invention is preferably 0.3 $m^2/g$ to 3 $m^2/g$, more preferably 0.4 $m^2/g$ to 2 $m^2/g$, and still more preferably 0.5 $m^2/g$ to 1 $m^2/g$. The above specific surface area can be measured in conformity with JIS Z8830. If the specific surface area of the potassium titanate powder is too large, the area wetted with a binder resin may be too large, so that the amount of binder involved in the overall strength of the resin composition may be small. With the use of the potassium titanate powder in a friction material, particularly in a friction material for a brake pad, the amount of thermosetting resin contained in the resin composition is small. Therefore, an excessively large specific surface area of the potassium titanate powder may decrease the mechanical strength of the resin composition. Furthermore, if the specific surface area of the potassium titanate powder is too large, the hygroscopicity becomes large. As a result, when water (moisture) adheres to the surface of the friction material or is taken into the friction material, so that the friction material absorbs moisture or water, the coefficient of friction of the friction material may become extremely high as compared with when the friction material is dry, resulting in the occurrence of brake noise (squeal) during braking. To cope with this, the specific surface area of the potassium titanate powder is adjusted at 0.3 $m^2/g$ to 3 $m^2/g$. Thus, a resin composition can be obtained which achieves a better balance between the mechanical strength and the friction-wear properties and the resin composition can be expected to reduce the squeal.

In the potassium titanate powder according to the present invention, potassium titanate is represented by a composition formula $K_2Ti_nO_{2n+1}$ (where n=5.5 to 6.5). Because, as just described, the potassium titanate powder according to the present invention is potassium hexatitanate or has a composition close to potassium hexatitanate, it has a tunnel crystal structure, and therefore has features of a high melting point, good chemical stability, and less elution of potassium ions (an alkaline component). It is considered that an alkaline component inhibits the setting of the thermosetting resin and the thermosetting resin thus deteriorates (decreases its strength). Therefore, the potassium titanate powder according to the present invention having a feature of less elution of alkali is desirable in terms of mechanical strength.

For the purposes of further increasing the dispersibility and further increasing the adhesion to the thermosetting resin, the potassium titanate powder according to the present invention may be subjected to surface treatment with a silane coupling agent (such as an aminosilane coupling agent), a titanate-based coupling agent or the like in an ordinary method.

The potassium titanate powder according to the present invention may be a friction modifier.

<Method for Producing Potassium Titanate Powder>

A method for producing a potassium titanate powder according to the present invention includes the steps of: (A) mixing, with mechanical grinding, a compound forming titanium dioxide by application of heat or titanium dioxide and potassium carbonate to prepare a ground mixture; (B) heating and firing the ground mixture in an atmosphere with a carbon dioxide concentration of 1% by volume to 60% by volume to prepare potassium dititanate; and (C) eluting potassium from the prepared potassium dititanate, followed by heating and firing.

The step (A) is the step of mixing, with mechanical grinding, a compound forming titanium dioxide by application of heat or titanium dioxide (hereinafter, referred to as a titanium source) and potassium carbonate to prepare a ground mixture.

No particular limitation is placed on the titanium source so long as it is a material containing titanium elements and not inhibiting the formation of titanium dioxide by application of heat or titanium dioxide, but examples of the compound include titanium dioxide, titanium suboxide, orthotitanic acid, salts of orthotitanic acid, metatitanic acid, salts of metatitanic acid, titanium hydroxide, peroxotitanic acid, and salts of peroxotitanic acid. These compounds can be used singly or in combination of two or more thereof. Preferred among them is titanium dioxide. The reason for this is that titanium dioxide has more excellent mixability and reactivity with potassium carbonate and is inexpensive. The crystal shape of titanium dioxide is preferably rutile or anatase.

No particular limitation is placed on the form of the titanium source because it is mixed while being mechanically ground as will be described hereinafter, but the titanium source is preferably in the form of powder having an average particle diameter of 0.1 μm to 500 μm for further ease of handling. The above powder also includes a powder in which secondary particles are formed because of difficulty of monodispersion of primary particles, and a material granulated from the powder. The average particle diameter of the titanium source in the present invention means a particle diameter at 50% cumulative volume in a particle size distribution determined by the laser diffraction and scattering method.

No particular limitation is placed on the form of potassium carbonate because it is mixed while being mechanically ground as will be described hereinafter, but potassium carbonate is preferably in the form of powder having an average particle diameter of 0.1 mm to 1 mm for further ease of handling. The above powder also includes a powder in which secondary particles are formed because of difficulty of monodispersion of primary particles, and a material granulated from the powder. The average particle diameter of potassium carbonate in the present invention means a particle diameter at 50% cumulative volume in a particle size distribution determined by the laser diffraction and scattering method.

The mixing ratio between the titanium source and potassium carbonate is preferably, in terms of oxides of the titanium element and the potassium element, a $TiO_2/K_2O$ molar ratio of 1.5 to 2.5.

Within a scope that enables the production of desired potassium titanate powder, part of potassium carbonate may be substituted with a compound or compounds different from potassium carbonate and forming potassium oxide by application of heat (hereinafter, referred to as another or other potassium sources). Examples of the other potassium sources include potassium hydroxide and potassium oxide. In using another or other potassium sources, the mixing ratio between potassium carbonate and other potassium sources is preferably, in molar ratio in terms of potassium atoms, potassium carbonate to other potassium sources=50:50 to 90:10.

An example of the mechanical grinding is the method of grinding the materials while making a physical impact on them. A specific example is a grinding process in a vibration mill. It can be considered that when a grinding process in a vibration mill is performed, shear stress produced due to frictional grinding of the powder mix concurrently causes a disorder of the atomic arrangement and a decrease in interatomic distance, so that atom transfer occurs at contact points between heterogeneous particles, resulting in the formation of a metastable phase. Thus, it can be considered that a ground mixture having a high reaction activity is obtained. In order to more efficiently apply shear stress to the materials, the mechanical grinding is preferably performed by a dry process in which water, a solvent or the like is not used.

There is no particular limitation as to the time for the mixing with mechanical grinding, but it is generally preferably within a range of 0.1 to 2 hours.

The step (B) is the step of heating and firing the ground mixture prepared in the step (A) in an atmosphere with a carbon dioxide concentration of 1% by volume to 60% by volume to prepare potassium dititanate.

The ground mixture prepared in the step (A) is heated and fired in an atmosphere in which the carbon dioxide concentration is controlled as described above. The control of the carbon dioxide concentration may be started after the ground mixture is increased in temperature by heating it from room temperature and before the temperature of the ground mixture reaches the reaction onset temperature of potassium carbonate. However, from the viewpoint of operability, the control is normally preferably performed from the start of heating (the room temperature). Furthermore, the control of the carbon dioxide concentration only has to be performed until the completion of the firing reaction, but is preferably performed until the ground mixture is cooled to 300° C. after the firing reaction from the viewpoint of operability.

There is no particular limitation as to the method for controlling the carbon dioxide concentration so long as the concentration can fall within the above range, and examples include the method of circulating a mixed gas of carbon dioxide and an inert gas, such as nitrogen or argon, or a mixed gas of carbon dioxide and air, and the method using an organic compound that, during heating and firing, forms carbon dioxide and disappears without reacting with the titanium source and potassium carbonate.

The carbon dioxide concentration is 1% by volume to 60% by volume and preferably 7% by volume to 55% by volume. In the case of forming potassium dititanate by the firing method using potassium carbonate and titanium dioxide, the reaction starts in the temperature increasing process to form potassium tetratitanate fibers and the potassium tetratitanate fibers react with the remaining potassium titanate to form potassium dititanate. These reactions are reactions forming carbon dioxide. Therefore, when these reactions are performed in an atmosphere of carbon dioxide, the temperature of formation of each compound shifts to a higher temperature. It can be considered that the formation of potassium tetratitanate fibers occurs at a higher temperature to promote the growth of the particle length and the growth of the particle breadth progresses during the subsequent formation of potassium dititanate, resulting in growth to coarse bar-like particles. If the carbon dioxide concentration is too high, this is undesirable because part of potassium carbonate may be unreacted to cause potassium tetratitanate fibers to remain unreacted. On the other hand, if the carbon dioxide concentration is too low, this is also undesirable because potassium dititanate may have an amoeboid shape.

The firing temperature of the ground mixture is preferably within a range of 800° C. to 1000° C. and more preferably within a range of 850° C. to 950° C. If the firing temperature is too low, the particle growth may become insufficient. If the firing temperature is too high, potassium titanate melts, which may make it difficult to control the particle shape. The firing time is, within the above temperature range, preferably 1 to 8 hours and more preferably 2 to 5 hours. The rate of temperature increase from room temperature (20° C.) to the above firing temperature is preferably 0.5° C./min to 10° C./min and more preferably 1° C./min to 5° C./min. After the firing reaction, the ground mixture is cooled to room temperature (20° C.). The cooling rate from the above firing temperature to 300° C. is preferably 0.5° C./min to 10° C./min and more preferably 1° C./min to 5° C./min.

For the firing in the step (B), any known firing method can be employed so long as it can control the carbon dioxide concentration and various types of firing means, for example, an electric furnace, a rotary kiln, a tubular furnace, a fluidized firing furnace or a tunnel kiln, can be used.

The step (C) is the step of eluting potassium from potassium dititanate prepared in the step (B), followed by heating and firing.

The elution of potassium can be performed, for example, by mixing an acid into an aqueous slurry of potassium dititanate to adjust the pH of the aqueous slurry. Since the pH adjustment of the aqueous slurry causes the elution of potassium from potassium dititanate, the amount of potassium eluted can be controlled by the pH and, therefore, by the subsequent firing, potassium titanate having a different composition can be produced while maintaining the particle shape of potassium dititanate. For example, when the pH of the aqueous slurry is adjusted to 7.5 to 8.5, potassium titanate having a composition $K_2Ti_nO_{2n+1}$ (where n=7.5 to 8.5) can be produced. For another example, when the pH of the aqueous slurry is adjusted to 11.5 to 12.5, potassium titanate according to the present invention having a composition $K_2Ti_nO_{2n+1}$ (where n=5.5 to 6.5) can be produced by the subsequent firing.

There is no particular limitation as to the concentration of the aqueous slurry and it can be appropriately selected from a wide range of concentrations, but it is, in view of the workability and so on, preferably 1% by mass to 30% by mass and more preferably 2% by mass to 20% by mass.

No particular limitation is placed on the type of the acid and examples that can be used include inorganic acids, such as sulfuric acid, hydrochloric acid, and nitric acid, and organic acids, such as acetic acid. The acid may be used in combination of two or more types of acids as necessary.

The measurement of the pH of the aqueous slurry is normally made after the aqueous slurry is mixed with the acid and stirred for an hour to five hours. The acid is normally used in the form of an aqueous solution. There is no particular limitation as to the concentration of the aqueous solution of the acid and it can be appropriately selected within a wide range of concentrations, but it is normally 1% by mass to 98% by mass.

After the elution of potassium, the mixture is subjected to a dewatering process by filtering, such as filtering by suction. After the dewatering process, the product is fired, so that a potassium titanate powder formed of bar-like potassium titanate particles as a final product can be obtained. The firing temperature in this case is preferably within a range of 600° C. to 1300° C. and more preferably within a range of 700° C. to 1000° C. The firing time is, within the above temperature range, preferably 0.5 to 8 hours and more preferably 1 to 6 hours. If the firing temperature is too low, crystalline conversion may become insufficient. If the firing temperature is too high, potassium titanate melts, which may make it difficult to control the particle shape. If the firing time is short, crystalline conversion may become insufficient. On the other hand, if the firing time is too long, the production efficiency may decrease.

There is no particular limitation as to the conditions of the firing atmosphere in the step (C) and, for example, the firing may be performed in an air atmosphere.

The firing in the step (C) can be performed using various types of firing means, such as an electric furnace, a rotary kiln, a tubular furnace, a fluidized firing furnace or a tunnel kiln. After the firing, the product may be subjected to a sieving process, classification or the like as necessary.

In the manner as thus far described, a potassium titanate powder formed of coarse bar-like potassium titanate particles can be produced.

<Resin Composition>

A resin composition according to the present invention is characterized by containing the potassium titanate powder according to the present invention and a thermosetting resin and may further contain, as necessary, a titanate compound powder other than the potassium titanate powder according to the present invention (hereinafter, also referred to simply as "titanate compound powder") and other materials.

A description will be given below of each of the components of the resin composition according to the present invention.

(Potassium Titanate Powder)

The potassium titanate powder that can be used is an arbitrary one appropriately selected from among the above-described potassium titanate powders each of which is formed of bar-like potassium titanate particles having an average length of 30 μm or more, an average breadth of 10 μm or more, and an average aspect ratio of 1.5 or more and in which the bar-like potassium titanate particles are represented by a composition formula $K_2Ti_nO_{2n+1}$ (where n=5.5 to 6.5).

The content of the potassium titanate powder in the resin composition according to the present invention is, for example, in using the resin composition according to the present invention as a friction material, preferably 3% by mass to 50% by mass, more preferably 3% by mass to 30% by mass, and still more preferably 5% by mass to 20% by mass relative to a total amount of the resin composition of 100% by mass. When the content of the potassium titanate powder according to the present invention is 3% by mass to 50% by mass, the friction material can be given excellent wear resistance, a high and stable coefficient of friction, and excellent fade resistance.

(Thermosetting Resin)

The thermosetting resin is used as a binder capable of being integrated with the potassium titanate powder and so on to give strength. Therefore, the thermosetting resin that can be used is an arbitrary one appropriately selected from among known thermosetting resins for use as a binder. Examples that can be cited include: phenolic resins; elastomer-dispersed phenolic resins, such as acrylic elastomer-dispersed phenolic resins and silicone elastomer-dispersed phenolic resins; modified phenolic resins, such as acrylic-modified phenolic resins and silicone-modified phenolic resins; formaldehyde resins; melamine resins; epoxy resins; acrylic resins; aromatic polyester resins; and urea resins. These resins can be used singly or in combination of two or more thereof. Preferred among them are phenolic resins and modified phenolic resins from the viewpoint of being capable of further increasing the thermal resistance, formability, and frictional properties.

The content of the thermosetting resin in the resin composition is, for example, in using the resin composition according to the present invention as a friction material, preferably 3% by mass to 20% by mass relative to a total amount of the resin composition of 100% by mass. When the content of the thermosetting resin is within a range of 3% by mass to 20% by mass, spaces between mixed materials are filled with a suitable amount of binder, so that more excellent frictional properties can be achieved.

(Titanate Compound Powder)

In the present invention, the resin composition may contain, in addition to the potassium titanate powder according to the present invention and the thermosetting resin, a titanate compound powder other than the potassium titanate powder according to the present invention as a friction modifier as necessary and without impairing the excellent, advantageous effects of the present invention.

Examples of the titanate compound that can be used in the present invention include: titanate compounds having a tunnel crystal structure, such as potassium hexatitanate (except for potassium titanate according to the present invention), sodium hexatitanate, and potassium octatitanate; and titanate compounds having a layered crystal structure, such as magnesium potassium titanates of $K_{0.2-0.7}Mg_{0.4}Ti_{1.6}O_{3.7-4}$ and lithium potassium titanates of $K_{0.5-0.7}Li_{02.7}Ti_{1.73}O_{3.85-3.95}$. Among them, lithium potassium titanate used in combination with the potassium titanate powder according to the present invention can provide further increased wear resistance.

The titanate compound powder is a powder formed of particles in a non-fibrous shape, such as spherical, lamellar, platy, prismoidal, blocky or irregular shape. The content of fibrous particles is preferably 0.3% by volume or less, more preferably 0.2% by volume or less, and still more preferably 0.1% by volume or less. When the content of fibrous particles is within the above range, safety and health concerns can be avoided.

In the titanate compound powder, its average particle diameter, which is a particle diameter at 50% cumulative volume in a particle size distribution determined by the laser diffraction and scattering method, is preferably 1 μm to 30 μm or less and more preferably 3 μm to 20 μm. When the average particle diameter is within the above range, the titanate compound powder can further increase, during use in a friction material, the frictional properties of the friction material.

The specific surface area of the titanate compound powder is preferably 0.3 $m^2/g$ to 3 $m^2/g$, more preferably 0.4 $m^2/g$ to 2 $m^2/g$, and still more preferably 0.5 $m^2/g$ to 1 $m^2/g$. The above specific surface area can be measured in conformity with JIS Z8830. If the specific surface area of the titanate compound powder is too large, the area wetted with a binder resin may become too large, so that the amount of binder involved in the overall strength of the resin composition may be small. With the use of the titanate compound powder in a friction material, particularly in a friction material for a brake pad, the amount of thermosetting resin contained in the resin composition is small. Therefore, an excessively large specific surface area of the titanate compound powder may decrease the mechanical strength of the resin composition. Furthermore, if the specific surface area of the titanate compound powder is too large, the hygroscopicity becomes large. As a result, when water (moisture) adheres to the surface of the friction material or is taken into the friction material, so that the friction material absorbs moisture or water, the coefficient of friction of the friction material may become extremely high as compared with when the friction material is dry, resulting in the occurrence of brake noise (squeal) during braking. To cope with this, the specific surface area of the titanate compound is adjusted at 0.3 $m^2/g$ to 3 $m^2/g$. Thus, a resin composition can be obtained which achieves a better balance between the mechanical strength and the friction-wear properties and the resin composition can be expected to further reduce the squeal.

The content of the titanate compound powder in the resin composition according to the present invention is, for example, in using the resin composition according to the present invention as a friction material, preferably 3% by mass to 15% by mass relative to a total amount of the resin composition of 100% by mass.

(Other Materials)

In using the resin composition according to the present invention as a friction material, the resin composition may contain, in addition to the above-mentioned potassium titanate powder and the thermosetting resin, other materials as necessary. Examples of the other materials include a fibrous base material and a friction modifier as will be described below.

Examples of the fibrous base material include: organic fibers, such as aromatic polyamide (aramid) fibers, fibrillated aramid fibers, acrylic fibers, cellulose fibers, and phenolic resin fibers; straight or curled metal fibers containing metal as a main component, such as fibers made of a metal alone or in an alloy form of copper, alumina, iron, zinc, tin, titanium, nickel, magnesium, silicon or other metals, copper fibers, and cast iron fibers; inorganic fibers, such as glass fibers, rock wool, ceramic fibers, biodegradable ceramic fibers, biodegradable mineral fibers, biosoluble fibers, wollastonite fibers, silicate fibers, and titanate fibers of mineral fibers or the like; and carbon-based fibers, such as flame-resistant fibers, PAN-based carbon fibers, pitch-based carbon fibers, and activated carbon fibers. These various kinds of fibers can be used singly or in combination of two or more thereof.

Examples of the friction modifier include: unvulcanized or vulcanized rubber powders, such as tire rubber, acrylic rubber, isoprene rubber, NBR (nitrile-butadiene rubber), SBR (styrene-butadiene rubber), chlorinated butyl rubber, butyl rubber, and silicone rubber; organic fillers, such as cashew dust and melamine dust; inorganic powders, such as barium sulfate, calcium carbonate, lithium carbonate, calcium hydroxide (hydrated lime), vermiculite, clay, mica, and talc; inorganic fillers, such as metal powders of a metal alone or in an alloy form of copper, bronze, aluminum, zinc, iron, tin or other metals; abrasive materials, such as silicon carbide, titanium oxide, alumina (aluminum oxide), silica (silicon dioxide), magnesia (magnesium oxide), zirconia (zirconium oxide), zirconium silicate, chromium oxide, iron oxide, chromite, and quartz; and solid lubricants, such as synthetic or natural graphite, phosphate-coated graphite, carbon black, coke, antimony trisulfide, molybdenum disulfide, tin sulfide, iron sulfide, zinc sulfide, tungsten disulfide, and polytetrafluoroethylene (PTEF). These friction modifiers can be used singly or in combination of two or more thereof.

The content of the other materials in the resin composition is, for example, in using the resin composition according to the present invention as a friction material, preferably 44% by mass to 94% by mass and more preferably 64% by mass to 89% by mass relative to a total amount of the resin composition of 100% by mass.

The resin composition according to the present invention has a content of a copper component of 0.5% by mass or less in terms of copper element in a total amount of the resin composition of 100% by mass, and is preferably free of copper component. Thus, the friction material can be environmentally friendly as compared to conventional friction materials. Note that the term "free of copper component" in the present invention means that the resin composition contains neither alloy (such as brass or bronze) nor compound containing copper fibers, copper powder or copper as a material for the resin composition.

(Method for Producing Resin Composition)

The resin composition according to the present invention can be produced by, for example, (1) the method of mixing components with a mixer (such as a Lodige mixer, a pressure kneader or an Eirich mixer) or (2) the method of preparing a granulated material of desired components and, if necessary, mixing it together with other components using a mixer (such as a Lodige mixer, a pressure kneader or an Eirich mixer).

The content of each component in the resin composition according to the present invention can be appropriately selected depending on the desired frictional properties and the resin composition can be produced using the above-described production methods.

Alternatively, the resin composition according to the present invention may be prepared by producing a master batch containing a particular component at a high concentration, adding a thermosetting resin and so on to the master batch, and mixing them.

<Friction Material and Friction Member>

In the present invention, a friction material having a predetermined shape can be produced by preliminarily forming the resin composition according to the present invention at ordinary temperature (20° C.), forming the resultant preform by the application of heat and pressure (at a forming pressure of 10 MPa to 40 MPa and a forming temperature of 150° C. to 200° C.), subjecting, if necessary, the resultant formed body to heat treatment (holding it at 150° C. to 220° C. for 1 hour to 12 hours) in a furnace, and then subjecting the formed body to machining and polishing processes.

The friction material according to the present invention is used as a friction member formed so that the friction material forms a friction surface. Examples of the friction member formable using a friction material include: (1) a structure composed of the friction material alone; and (2) a structure including a substrate, such as a back metal, and the friction material according to the present invention provided on the substrate and providing a friction surface.

The substrate is used in order to further increase the mechanical strength of the friction member, wherein metal, fiber-reinforced resin or other materials can be used as the material for the substrate. Examples of the material include iron, stainless steel, glass fiber-reinforced resin, and carbon fiber-reinforced resin.

A friction material generally has a large number of microscopic pores formed inside thereof and these pores serve as escape routes for decomposition products (gas and liquid substances) at high temperatures to prevent reduction in frictional properties and concurrently reduce the stiffness of the friction material and increase the damping performance thereof, thus preventing the occurrence of squeal. In a normal friction material, the mixing and forming conditions of the materials are controlled so that the porosity is 10% to 20%.

Since the friction member according to the present invention has excellent wear resistance, a high and stable coefficient of friction, and excellent fade resistance, it can be suitably used as a friction member for various types of vehicles, industrial machines, and so on, such as a brake lining or a disc pad each constituting part of a braking device or a clutch facing. In using the friction material as a friction member for a disc pad (pad brake), the mixing and forming conditions of the materials are preferably controlled so that the friction material has a Rockwell hardness of 80 HRS to 95 HRS.

EXAMPLES

The present invention will be described below in further detail with reference to specific examples. The present invention is not at all limited by the following examples and modifications and variations may be appropriately made therein without changing the gist of the invention.

<Production of Potassium Titanate Powder>

In the synthesis examples, examples, and comparative examples below, the composition of potassium titanate was confirmed by an X-ray diffraction measurement device (product number "Ultima IV" manufactured by Rigaku Corporation). The shapes of particles forming potassium titanate powder and particles forming titanate compound powder were observed with a scanning electron microscope (SEM, product number "5-4800" manufactured by Hitachi High-Technologies Corporation). The lengths and breadths of particles forming potassium titanate powder were measured from a SEM photograph at 400-fold (or a photograph at 1000-fold as for fibrous particles) using an image analysis software (product name "WinRooF2015" produced by Mitani Corporation) and the average length, the average breadth, the average aspect ratio, and the content of particles were calculated. The specific surface areas of potassium titanate powder and titanate compound powder were measured by an automatic specific surface area measurement device (product number "TriStar II 3020" manufactured by Micromeritics Instrument Corporation). The average particle diameters of potassium titanate powder and titanate compound powder by laser diffractometry were measured by a laser diffraction particle size distribution measurement device (product number "SALD-2100" manufactured by Shimadzu Corporation).

Synthesis Example 1

Titanium oxide and potassium carbonate weighed to give $TiO_2/K_2O=2.0$ (molar ratio) were mixed for 0.5 hours while being ground in a vibration mill.

The obtained ground mixture was packed in an alumina boat, increased in temperature four hours from room temperature to 880° C. in a tubular furnace, and then fired at 880° C. for four hours. Thereafter, the ground mixture was cooled four hours to room temperature (20° C.), thus obtaining a powder. The carbon dioxide concentration in the furnace was controlled at 0% (equivalent to the atmosphere) by introducing air into the furnace from the start of heating to the end of cooling.

The composition of the obtained powder was $K_2Ti_2O_5$ (potassium dititanate). The shape of particles forming the powder was amoeboid as shown on the SEM photograph in FIG. 1. The results are shown in Table 1. Furthermore, the X-ray diffraction chart of the powder is shown in FIG. 6.

Synthesis Examples 2 to 6

Powders were obtained in the same manner as in Synthesis Example 1 except that the gas circulated in the furnace from the start of heating to the end of cooling was changed from air to a mixed gas of carbon dioxide and air and carbon dioxide in the furnace was controlled at the $CO_2$ concentrations described in Table 1.

The compositions of the obtained powders and the shapes of particles forming the powders are shown in Table 1. The shapes of particles forming the powders in Synthesis Examples 2 to 5 were confirmed on the SEM photographs shown in FIGS. 2 to 5, respectively. Furthermore, the X-ray diffraction charts of the powders obtained in Synthesis Examples 1 to 6 are shown in FIG. 6. It was confirmed that particles of potassium hexatitanate and so on forming powders as final products produced using the powders obtained in Synthesis Examples 1 to 6 also had substantially the same shapes.

TABLE 1

|  | Synth. Ex. 1 | Synth. Ex. 2 | Synth. Ex. 3 | Synth. Ex. 4 | Synth. Ex. 5 | Synth. Ex. 6 |
|---|---|---|---|---|---|---|
| $CO_2$ Conc. (% by volume) | 0 | 5 | 10 | 30 | 50 | 70 |
| Composition | $K_2Ti_2O_5$ | $K_2Ti_2O_5$ | $K_2Ti_2O_5$ | $K_2Ti_2O_5$ | $K_2Ti_2O_5$ | $K_2Ti_2O_5$ + $K_2Ti_4O_9$ |
| Particle Shape | amoeboid | bar-like | bar-like | bar-like | bar-like | bar-like + fibrous |

Production of Potassium Hexatitanate

Comparative Example 1

Using as a base material potassium dititanate produced in Synthesis Example 2, 250 ml of 20% by mass slurry was prepared. A 98% by mass sulfuric acid was added to the slurry and the mixture was stirred for an hour to adjust the pH to 12. The pH-adjusted slurry was filtered, washed with water, and dried and the dried product was then packed into a crucible and fired at 900° C. for four hours in an electric furnace in an air atmosphere, thus obtaining a powder.

The composition of the obtained powder was $K_2Ti_6O_{13}$ (potassium hexatitanate). The shape of particles forming the powder was bar-like. The particles had an average length of 20 μm, an average breadth of 12 μm, and an average aspect ratio of 1.7. The content of fibrous particles was 0.09% by volume and the content of particles having a length of 30 μm or more and a breadth of 10 μm or more was 43% by volume. The specific surface area of the powder was 0.7 $m^2/g$. The average particle diameter by laser diffractometry was 23 μm. The results are shown in Table 2.

Examples 1 to 3

Powders were obtained in the same manner as in Comparative Example 1 except that their base materials were changed to those produced in respective Synthesis Examples described in Table 2. The results of the compositions of the obtained powders, the shapes, average lengths, average breadths, and average aspect ratios of particles forming the powders, the contents of fibrous particles, the contents of particles having a length of 30 μm or more and a breadth of 10 μm or more, the specific surface areas of the powders, and the average particle diameters by laser diffractometry are as shown in Table 2.

FIG. 7 shows the X-ray diffraction charts of the base material (potassium dititanate), acid-treated potassium dititanate, and obtained potassium titanate powder (potassium hexatitanate) in Example 2.

Example 4

Titanium oxide and potassium carbonate weighed to give $TiO_2/K_2O=2.0$ (molar ratio) were mixed for 0.5 hours while being ground in a vibration mill.

The obtained ground mixture was packed in a tubular furnace, increased in temperature four hours from room temperature (20° C.) to 880° C., and then fired at 880° C. for four hours. Thereafter, the ground mixture was cooled four hours to room temperature (20° C.), thus obtaining a powder of $K_2Ti_2O_5$ (potassium dititanate). The carbon dioxide concentration in the furnace was controlled at 8% by volume by circulating a mixed gas of carbon dioxide and air in the furnace from the start of heating to the end of cooling.

Using the obtained potassium dititanate, 250 ml of 20% by mass slurry was prepared. A 98% by mass sulfuric acid was added to the slurry and the mixture was stirred for an hour to adjust the pH to 12. The slurry was filtered, washed with water, and dried and the dried product was then packed into a crucible and fired at 900° C. for four hours in an air atmosphere in an electric furnace, thus obtaining a powder.

The composition of the obtained powder was $K_2Ti_6O_{13}$ (potassium hexatitanate). The shape of particles forming the powder was bar-like. The particles had an average length of 35 μm, an average breadth of 19 μm, and an average aspect ratio of 1.9. The content of fibrous particles was 0.06% by volume. The content of particles having a length of 30 μm or more and a breadth of 10 μm or more was 87% by volume. The specific surface area of the powder was 0.9 $m^2/g$. The average particle diameter by laser diffractometry was 37 μm. The results are shown in Table 3. A SEM photograph of particles forming the powder is shown in FIG. 8.

Comparative Example 2

Titanium oxide and potassium carbonate weighed to give $TiO_2/K_2O=2.0$ (molar ratio) were mixed for 0.5 hours while being ground in a vibration mill.

The obtained ground mixture was packed into a crucible and fired at 860° C. for four hours in an air atmosphere in

TABLE 2

|  | Comp. Ex. 1 | Ex. 1 | Ex. 2 | Ex. 3 |
|---|---|---|---|---|
| Base Material | Synth. Ex. 2 | Synth. Ex. 3 | Synth. Ex. 4 | Synth. Ex. 5 |
| Composition | $K_2Ti_6O_{13}$ | $K_2Ti_6O_{13}$ | $K_2Ti_6O_{13}$ | $K_2Ti_6O_{13}$ |
| Particle Shape | bar-like | bar-like | bar-like | bar-like |
| Average Length (μm) | 20 | 40 | 85 | 68 |
| Average Breadth (μm) | 12 | 23 | 52 | 44 |
| Average Aspect Ratio | 1.7 | 1.8 | 1.6 | 1.5 |
| Content of Fibrous Particles (% by volume) | 0.09 | 0.04 | 0.02 | 0.04 |
| Content of Particles with 30 μm or more Length and 10 μm or more Breadth (% by volume) | 43 | 86 | 98 | 97 |
| Specific Surface Area ($m^2/g$) | 0.7 | 0.8 | 0.6 | 0.9 |
| Average Particle Diameter by Laser Diffractometry (μm) | 23 | 37 | 71 | 79 | an electric furnace. The obtained fired body was disintegrated in a hammer mill, thus obtaining a powder of $K_2Ti_2O_5$ (potassium dititanate).

Using the obtained potassium dititanate, 250 ml of 20% by mass slurry was prepared. A 98% by mass sulfuric acid was added to the slurry and the mixture was stirred for an hour to adjust the pH to 12. The slurry was filtered, washed with water, and dried and the dried product was then packed into a crucible and fired at 600° C. for an hour in an air atmosphere in an electric furnace, thus obtaining a powder.

The composition of the obtained powder was $K_2Ti_6O_{13}$ (potassium hexatitanate). The shape of particles forming the powder was amoeboid. The content of fibrous particles was 0.04% by volume. The content of particles having a length of 30 μm or more and a breadth of 10 μm or more was 4% by volume. The specific surface area of the powder was 8.0 $m^2/g$. The average particle diameter by laser diffractometry was 13 μm. The results are shown in Table 3.

Comparative Example 3

Titanium oxide, potassium carbonate, and lithium carbonate were mixed in a ratio of Ti:K:Li=1.73:0.8:0.27 (molar ratio) and the mixture was packed in a crucible and then fired at 1030° C. for three hours in an air atmosphere in an electric furnace. The obtained fired body was ground in a hammer mill, the ground product was dispersed in water into a 10% by mass slurry, and the slurry was wet disintegrated by stirring for an hour. The disintegrated product was filtered and dried and the dried product was then classified by passing it through a sieve with 75-μm openings. The obtained product was confirmed to be lithium potassium titanate by X-ray diffractometry.

Using the obtained potassium lithium titanate, 500 ml of 10% by mass slurry was prepared. A 98% sulfuric acid was added to the slurry to adjust the pH to 1.6, the mixture was stirred for five hours, filtered, and washed with water, the filter cake was dispersed again in 400 ml of water, and a 40% by mass aqueous solution of potassium hydroxide was added to the dispersion to adjust the pH to 13.75, followed by stirring for five hours. Thereafter, the dispersion was filtered, washed with water, and dried and the dried product was then packed into a crucible and fired at 700° C. for three hours in an air atmosphere in an electric furnace, thus obtaining a powder.

The composition of the obtained powder was $K_2Ti_6O_{13}$ (potassium hexatitanate). The shape of particles forming the powder was platy. The content of fibrous particles was 0.03% by volume. The content of particles having a length of 30 μm or more and a breadth of 10 μm or more was 26% by volume. The specific surface area of the powder was 1.5 $m^2/g$. The average particle diameter by laser diffractometry was 21 μm. The results are shown in Table 3.

Comparative Example 4

Titanium oxide and potassium carbonate weighed to give $TiO_2/K_2O=2.0$ (molar ratio) were mixed with grinding in an automatic mortar, which was continued for 0.5 hours. An amount of 75 g of the obtained ground mixture was packed in a crucible and then fired at 800° C. for three hours in an air atmosphere in an electric furnace.

The obtained fired body was disintegrated in a hammer mill and $TiO_2$ (anatase) was added to the ground product to give $TiO_2/K_2O=6$, followed by mixing with grinding for 0.5 hours in an automatic mortar. The obtained mixed powder was fired at 1150° C. for two hours and the fired body was disintegrated in a hammer mill, thus obtaining a powder.

The composition of the obtained powder was $K_2Ti_6O_{13}$ (potassium hexatitanate). The shape of particles forming the powder was bar-like. The particles had an average length of 11 μm, an average breadth of 5 μm, and an average aspect ratio of 2.2. The content of fibrous particles was 3.06% by volume. The content of particles having a length of 30 μm or more and a breadth of 10 μm or more was 0% by volume. The specific surface area of the powder was 0.4 $m^2/g$. The average particle diameter by laser diffractometry was 11 μm. The results are shown in Table 3.

TABLE 3

|  | Ex. 4 | Comp. Ex. 2 | Comp. Ex. 3 | Comp. Ex. 4 |
| --- | --- | --- | --- | --- |
| Composition | $K_2Ti_6O_{13}$ | $K_2Ti_6O_{13}$ | $K_2Ti_6O_{13}$ | $K_2Ti_6O_{13}$ |
| Particle Shape | bar-like | amoeboid | platy | bar-like |
| Average Length (μm) | 35 | — | — | 11 |
| Average Breadth (μm) | 19 | — | — | 5 |
| Average Aspect Ratio | 1.9 | — | — | 2.2 |
| Content of Fibrous Particles (% by volume) | 0.06 | 0.04 | 0.03 | 3.06 |
| Content of Particles with 30 μm or more Length and 10 μm or more Breadth (% by volume) | 87 | 4 | 26 | 0 |
| Specific Surface Area ($m^2/g$) | 0.9 | 8.0 | 1.5 | 0.4 |
| Average Particle Diameter by Laser Diffractometry (μm) | 37 | 13 | 21 | 11 |

Production of Friction Material

Examples 5 to 9 and Comparative Examples 5 to 12

Materials were compounded at each compounding ratio shown in Tables 4 and 6 and mixed with an Eirich mixer, thus obtaining resin compositions in Examples and Comparative Examples. The unit for the amount of each component compounded in Tables 4 and 6 is % by mass in the resin composition. Each of the obtained resin compositions was preliminarily formed (at a forming pressure of 25 MPa), then formed by application of heat and pressure (at a forming pressure of 20 MPa and a forming temperature of 150° C.), and further subjected to a heat treatment (at 220° C.). The obtained formed body was processed into a sector form having an area of 5.5 $cm^2$, thus obtaining a friction material. Table 5 shows the crystal structures, particle shapes, contents of fibrous particles, contents of particles having a length of 30 μm or more and a breadth of 10 μm or more, specific surface areas, and average particle diameters by laser diffractometry of titanate compound powders (Potassium octatitanate powder 1, Potassium octatitanate powder 2, Lithium potassium titanate powder, and Magnesium potassium titanate powder) used in Table 6.

<Evaluation of Physical Properties of Friction Material>

Each of the friction materials in Examples and Comparative Examples produced in the above manners was measured in terms of Rockwell hardness in conformity with JIS D4421 and the results are shown in Tables 4 and 6. S scale was used as a scale for hardness. The porosity was measured in conformity with JIS D4418. The specific gravity was measured in conformity with JIS D4417. The results are shown in Tables 4 and 6.

<Evaluation of Frictional Properties of Friction Material>

The friction materials in Examples and Comparative Examples produced in the above manners were subjected to a friction test under conditions conforming with JASO C406 using a dynamometer tester and a gray cast iron FC250 rotor to measure their average coefficients of friction (averages through the test), amounts of friction material wear (differences between the friction material thicknesses before and after the test), and amounts of rotor wear (differences between the rotor masses before and after the test). The results are shown in Tables 4 and 6.

The fade rates of the friction materials in the first fade in the above friction test were calculated from the following equation (1). The results are shown in Tables 4 and 6.

$$\text{Fade rate (\%)} = \{(\text{minimum coefficient of friction})/\text{coefficient of friction in the first fade}\} \times 100 \quad (1)$$

TABLE 4

| | | Ex. 5 | Comp. Ex. 5 | Comp. Ex. 6 | Comp. Ex. 7 | Comp. Ex. 8 |
|---|---|---|---|---|---|---|
| Composition % by mass | Potassium hexatitanate powder (Ex. 4) | 19 | | | | |
| | Potassium hexatitanate powder (comp. Ex. 1) | | 19 | | | |
| | Potassium hexatitanate powder (comp. Ex. 2) | | | 19 | | |
| | Potassium hexatitanate powder (comp. Ex. 3) | | | | 19 | |
| | Potassium hexatitanate powder (comp. Ex. 4) | | | | | 19 |
| | Phenolic resin | 9 | 9 | 9 | 9 | 9 |
| Other Materials | Barium sulfate | 30 | 30 | 30 | 30 | 30 |
| | Mica | 5 | 5 | 5 | 5 | 5 |
| | Cashew dust | 5 | 5 | 5 | 5 | 5 |
| | Iron oxide | 9 | 9 | 9 | 9 | 9 |
| | Zirconium silicate | 9 | 9 | 9 | 9 | 9 |
| | Antimony sulfide | 2 | 2 | 2 | 2 | 2 |
| | Graphite | 2 | 2 | 2 | 2 | 2 |
| | Aramid pulp | 3 | 3 | 3 | 3 | 3 |
| | Calcium hydroxide | 2 | 2 | 2 | 2 | 2 |
| | Rock wool | 5 | 5 | 5 | 5 | 5 |
| Evaluations | Rockwell Hardness (HRS) | 91 | 86 | 88 | 91 | 91 |
| | Porosity (%) | 16 | 17 | 18 | 17 | 16 |
| | Specific Gravity | 2.4 | 2.4 | 2.4 | 2.4 | 2.4 |
| | Average Coefficient of Friction | 0.404 | 0.403 | 0.397 | 0.387 | 0.391 |
| | Amount of Friction Material Wear (mm) | 0.29 | 0.38 | 0.44 | 0.33 | 0.34 |
| | Amount of Rotor Wear (mg) | 0.11 | 0.08 | 0.11 | 0.10 | 0.10 |
| | Fade Rate (%) | 92 | 67 | 75 | 69 | 73 |

TABLE 5

| | Potassium Octatitante Powder 1 | Potassium Octatitante Powder 2 | Lithium Potassium Titanate Powder | Magnesium Potassium Titanate Powder |
|---|---|---|---|---|
| Crystal Structure | tunnel | tunnel | lamellar | lamellar |
| Particle Shape | platy | amoeboid | platy | platy |
| Content of Fibrous Particles (% by volume) | 0.04 | 0.06 | 0.07 | 0 |
| Content of Particles with 30 μm or more Length and 10 μm or more Breadth (% by volume) | 0 | 7 | 24 | 0 |
| Specific Surface Area (m$^2$/g) | 3.5 | 7.9 | 0.8 | 1.3 |
| Average Particle Diameter by Laser Diffractometry (μm) | 7 | 11 | 18 | 4 |
| Product Name | Terracess TF-S | Terracess JP | Terracess L | Terracess PS |
| Manufacturer | Otsuka Chemical | Otsuka Chemical | Otsuka Chemical | Otsuka Chemical |

TABLE 6

| | | Ex. 5 | Ex. 6 | Ex. 7 | Ex. 8 | Ex. 9 | Comp. Ex. 9 | Comp. Ex. 10 | Comp. Ex. 11 | Comp. Ex. 12 |
|---|---|---|---|---|---|---|---|---|---|---|
| Composition (% by mass) | Potassium hexatitanate powder (Ex. 4) | 19 | 10 | 10 | 10 | 10 | | | | |
| | Potassium hexatitanate powder 1 | | 9 | | | | 19 | | | |
| | Potassium hexatitanate powder 2 | | | 9 | | | | 19 | | |
| | Lithium potassium titanate powder | | | | 9 | | | | 19 | |
| | Magnesium potassium titanate powder | | | | | 9 | | | | 19 |

TABLE 6-continued

|  |  | Ex. 5 | Ex. 6 | Ex. 7 | Ex. 8 | Ex. 9 | Comp. Ex. 9 | Comp. Ex. 10 | Comp. Ex. 11 | Comp. Ex. 12 |
|---|---|---|---|---|---|---|---|---|---|---|
|  | Phenolic resin | 9 | 9 | 9 | 9 | 9 | 9 | 9 | 9 | 9 |
|  | Other Materials Barium sulfate | 30 | 30 | 30 | 30 | 30 | 30 | 30 | 30 | 30 |
|  | Mica | 5 | 5 | 5 | 5 | 5 | 5 | 5 | 5 | 5 |
|  | Cashew dust | 5 | 5 | 5 | 5 | 5 | 5 | 5 | 5 | 5 |
|  | Iron oxide | 9 | 9 | 9 | 9 | 9 | 9 | 9 | 9 | 9 |
|  | Zirconium silicate | 9 | 9 | 9 | 9 | 9 | 9 | 9 | 9 | 9 |
|  | Antimony sulfide | 2 | 2 | 2 | 2 | 2 | 2 | 2 | 2 | 2 |
|  | Graphite | 2 | 2 | 2 | 2 | 2 | 2 | 2 | 2 | 2 |
|  | Aramid pulp | 3 | 3 | 3 | 3 | 3 | 3 | 3 | 3 | 3 |
|  | Calcium hydroxide | 2 | 2 | 2 | 2 | 2 | 2 | 2 | 2 | 2 |
|  | Rock wool | 5 | 5 | 5 | 5 | 5 | 5 | 5 | 5 | 5 |
| Evaluations | Rockwell Hardness (HRS) | 91 | 88 | 89 | 90 | 90 | 87 | 88 | 90 | 87 |
|  | Porosity (%) | 16 | 18 | 17 | 16 | 15 | 20 | 18 | 15 | 15 |
|  | Specific Gravity | 2.4 | 2.4 | 2.4 | 2.4 | 2.4 | 2.4 | 2.4 | 2.5 | 2.5 |
|  | Average Coefficient of Friction | 0.404 | 0.423 | 0.411 | 0.405 | 0.416 | 0.419 | 0.410 | 0.374 | 0.387 |
|  | Amount of Friction Material Wear (mm) | 0.29 | 0.42 | 0.38 | 0.24 | 0.31 | 0.53 | 0.44 | 0.25 | 0.30 |
|  | Amount of Rotor Wear (mg) | 0.11 | 0.13 | 0.10 | 0.05 | 0.07 | 0.14 | 0.11 | 0.06 | 0.07 |
|  | Fade Rate (%) | 92 | 95 | 94 | 94 | 91 | 86 | 71 | 86 | 86 |

As shown in Table 4, the friction material in Example 5 according to the present invention exhibited a large fade rate as compared to those in Comparative Examples 5 to 8. A fade rate nearer to 100% means more excellent fade resistance. Therefore, it can be seen that the friction material in Example 5 according to the present invention has excellent fade resistance as compared to the other friction materials.

Furthermore, it is known that in conventional friction materials, the higher the average coefficient of friction, the larger the amount of wear of the friction material (amount of friction material wear) becomes. As shown in FIG. 9, it can be seen that the friction materials in Comparative Examples 6 to 8 also have the same tendency. However, it can be seen that, unlike the above friction materials, Example 5, which is a friction material containing the potassium titanate powder according to the present invention, achieved an unexpected effect of a small amount of wear of the friction material regardless of its high coefficient of friction. It can be considered that the use of the potassium titanate powder according to the present invention increased the reinforceability of the friction material surface and thus enabled the achievement of a high coefficient of friction and a low amount of wear.

As shown in Tables 5 and 6, it can be seen the friction material in Example 5 according to the present invention exhibited a high fade rate and a small amount of wear even if it was free of copper component, as compared to Comparative Examples 9 and 10 which are conventional friction materials using titanate compound powders having a tunnel crystal structure. Furthermore, it can be seen that the friction material in Example 5 according to the present invention exhibited a high fade rate and a high average coefficient of friction even if it was free of copper component, as compared to Comparative Examples 11 and 12 which are conventional friction materials using titanate compound powders having a lamellar crystal structure.

The invention claimed is:

1. A potassium titanate powder formed of bar-like potassium titanate particles having an average length of 30 μm or more, an average breadth of 15 μm or more, and an average aspect ratio of 1.5 to 3, the bar-like potassium titanate particles being represented by a composition formula $K_2Ti_nO_{2n+1}$ (where n=5.5 to 6.5).

2. The potassium titanate powder according to claim 1, wherein a content of particles having a length of 30 μm or more and a breadth of 10 μm or more is 50% by volume or more.

3. The potassium titanate powder according to claim 1, wherein a content of fibrous particles is 0.3% by volume or less.

4. The potassium titanate powder according to claim 1, having a specific surface area of 0.3 m$^2$/g to 3 m$^2$/g.

5. A friction modifier made of the potassium titanate powder according to claim 1.

6. A resin composition containing the potassium titanate powder according to claim 1 and a thermosetting resin.

7. The resin composition according to claim 6, wherein a content of a copper component is 0.5% by mass or less in terms of copper element in a total amount of the resin composition of 100% by mass.

8. A friction material being a formed body of the resin composition according to claim 6.

9. A friction member comprising the friction material according to claim 8.

* * * * *